March 4, 1924. 1,485,654
C. L. WEIL
APPARATUS FOR MEASURING THE FLOW OF FLUIDS
Filed Oct. 6, 1919
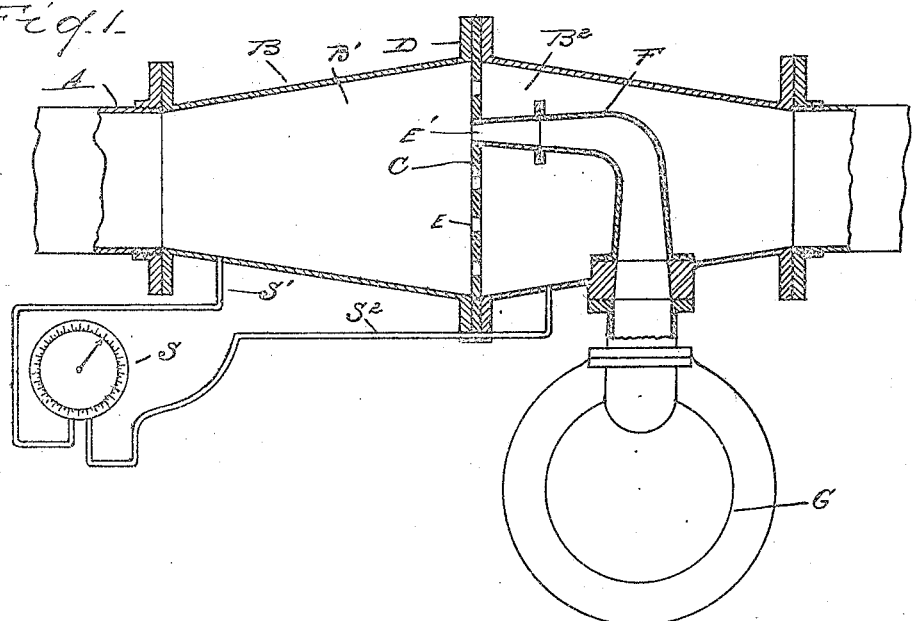
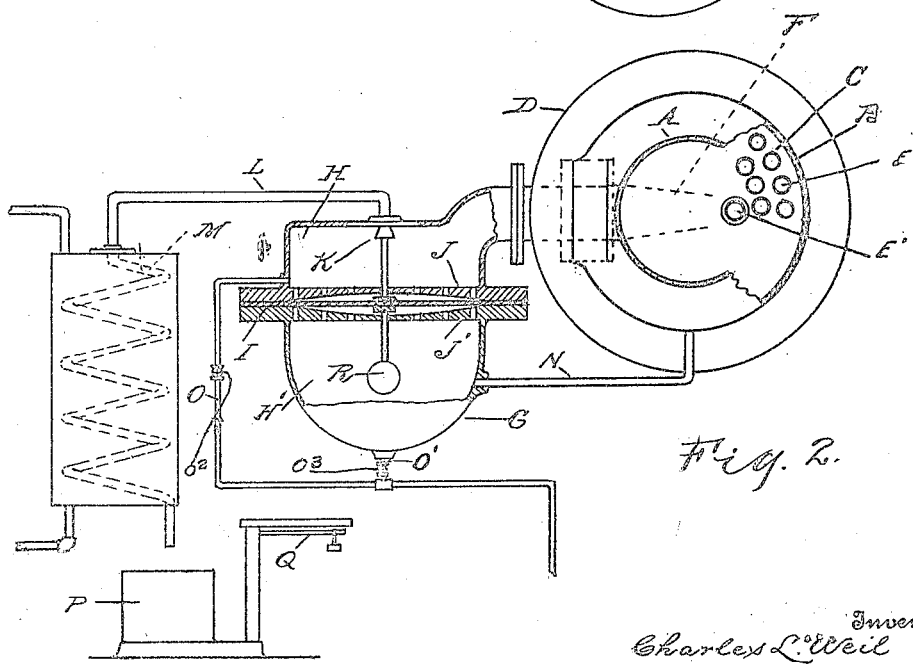
Inventor
Charles L. Weil
By Whittemore, Hulbert & Whittemore
Attorneys Patented Mar. 4, 1924.

1,485,654

UNITED STATES PATENT OFFICE.

CHARLES L. WEIL, OF PORT HURON, MICHIGAN; ELLA S. WEIL SPECIAL ADMINISTRATRIX OF CHARLES L. WEIL, DECEASED.

APPARATUS FOR MEASURING THE FLOW OF FLUIDS.

Application filed October 6, 1919. Serial No. 328,367.

*To all whom it may concern:*

Be it known that I, CHARLES L. WEIL, a citizen of the United States of America, residing at Port Huron, in the county of St. Clair and State of Michigan, have invented certain new and useful Improvements in Apparatus for Measuring the Flow of Fluids, of which the following is a specification, reference being had therein to the accompanying drawings.

The invention relates to the measurement of the flow of fluids and it is the object of the invention to obtain greater accuracy; also to provide means of checking other flow meters or indicators.

In the present state of the art various constructions of devices have been used for measuring the flow of fluids, but in practice it has been found that most of these are very inaccurate. With my improved construction a small part of the fluid is diverted while maintaining the same conditions as to frictional resistance or back pressure. This diverted portion is then weighed, or otherwise accurately measured, and as the ratio between the amount so diverted and the remainder of the fluid is known the total flow is accurately measured.

While my apparatus is applicable to the measurement of various fluids, I shall specifically describe its application to the measurement of the flow of steam.

In the drawings:

Figure 1 is a diagrammatic sectional plan view of the apparatus;

Figure 2 is a cross-section thereof.

A is the conduit through which the steam is flowing, and B is my improved meter which is coupled in between sections of the conduit A. This meter comprises a casing which is of a cylindrical form enlarged in diameter at the center and tapering towards opposite ends, said ends being equal in area to the cross-section of the conduit. C is a disk or partition extending centrally across the casing to divide the same into chambers B' and B², being preferably clamped between sections of the casing provided with flanges D. The disk or partition C is formed with a series of like apertures E extending therethrough and of a determined number. One of these apertures E' has connected therewith in the chamber B² or on the side towards which the steam is flowing a conduit F, preferably gradually enlarging to avoid frictional resistance. This conduit F passes out through the side of the casing and is connected with a casing G and this casing is formed with two separate chambers or compartments therein H and H', separated from each other by a flexible diaphragm I. The diaphragm is preferably arranged between perforated rigid plates J and J' which limit the amount of deflection to within the elastic limit of the material. The diaphragm I controls a valve K for variably restricting an outlet from the chamber H, said outlet being connected by a conduit L with a condenser M. There is also a connection between the chamber B² in the casing C and the chamber H' in the casing G formed by the conduit N. O and O' are drain conduits connected to the chambers H and H' for removing condensation therefrom and O² and O³ are suitable valves in the respective conduits for preventing the pressures in chambers H and H' from being equalized through the drain conduits.

With the construction as described when steam is flowing through the conduit A, it will be obliged to pass through the apertures E and E' in the diaphragm C and by reason of the resistance of the diaphragm there will be a slight drop in pressure in the chamber B² in comparison with the pressure in the chamber B'. The pressure in the chamber B² is communicated to the chamber H' in the casing G and consequently will be the same in the latter casing. On the other hand, the pressure in the chamber H of the casing G will be determined by the restriction of the discharge from said chamber through the conduit L. Inasmuch, however, as the diaphragm I is subjected on its opposite sides to the pressures in the chambers H and H' and as said diaphragm is flexible, it is evident that any difference in pressure in the chambers will cause a deflection of the diaphragm. This in turn will adjust the valve K so as to vary the restriction of the outlet with the result that the pressures in the chambers H and H' will be substantially equalized. When this condition of substantially equal pressures is established in the chambers H and H', the resistance of the discharge of the steam through each of the apertures E will be practically equal to the resistance of the discharge through the aperture E' and consequently the flow through said apertures will be practically equal. Assuming that there are one hundred of the apertures E and but one of the apertures E', the amount of steam diverted into the conduit F, chamber H, conduit L and condenser M will be one per cent of the amount of steam flowing through the apertures E. The steam passing through the condenser M will be fully condensed and can be easily measured by suitable means, such as the tank P on the scales Q. From this measurement the total flow may be readily computed.

In order to secure accuracy in the result, the resistance of the diaphragm I is reduced to the minimum by making said diaphragm of relatively large area and great flexibility. A counter-balancing weight R, or other means, may be used for initially balancing the differential pressure on the diaphragm, occasioned by the area of the valve stem K. When, however, the valve K is opened and the steam pressure is against the opposite side of the valve, the diaphragm would be unbalanced. However, this opening movement of the valve is resisted to some small degree by the flexing of the diaphragm and by properly proportioning the parts the weight R, or other balancing device, may exactly or approximately balance the resistance of the diaphragm in deflected position. Thus, the steam pressures on opposite sides of the diaphragm will be substantially the same, so as to increase the accuracy of the measurement.

One important feature of my invention is its use as a check upon other flow meters. For instance, as shown, a differential gauge S may be connected by the conduits S' and S² with the chambers B' and B² and by suitably calibrating this gauge, the flow will be accurately indicated. My measuring device provides an accurate means of calibrating this instrument and thus its accuracy may be verified from time to time. By using the two instruments in conjunction, readings may ordinarily be taken from the indicator and an occasional checking by the other instrument will secure accuracy.

What I claim as my invention is:

1. An apparatus for measuring the flow of fluids comprising a fluid conduit, a partition extending across said conduit having a plurality of apertures permitting the fluid to pass therethrough, a second conduit connected to one of said apertures to divert the fluid passing therethrough from the main stream, means for maintaining the same condition of back pressure against the diverted stream as against the main stream, and means for measuring the amount of fluid passing through said second conduit.

2. An apparatus for measuring the flow of fluids comprising a fluid conduit, a partition extending across said conduit having a plurality of apertures therethrough, a second conduit connected to one of said apertures to divert the fluid passing therethrough from the main stream, said conduit having the inlet portion thereof extending in substantially the same direction as the direction of flow through said apertures, means for maintaining the same condition of back-pressure against the diverted stream as against the main stream, and means for measuring the fluid passing through said second conduit.

3. An apparatus for measuring the flow of fluids comprising a conduit through which the fluid flows, a partition extending across said conduit having a plurality of apertures therethrough, means for diverting the fluid discharged through one of the apertures to collect and measure the same, and means controlled by the variance in the difference in the head pressure of the diverted stream and the back pressure in the conduit behind the partition for maintaining the same condition of back pressure against the diverted stream as against each of the streams discharging through the other apertures.

4. An apparatus for measuring the flow of fluids comprising a conduit having a partition extending there-across provided with a plurality of like apertures therethrough, means for diverting the fluid discharged through one of said apertures and condensing the same, means controlled by the differential between the head pressure of the diverted stream and the back pressure in the conduit behind the partition for maintaining the same condition of back pressure against the diverted stream as against the streams discharging through the other apertures of the partition, and means for measuring the condensed fluid to compute therefrom the total flow.

5. An apparatus for measuring the flow of fluids comprising a conduit through which the fluid flows, a partition across said conduit having a plurality of like apertures therethrough, a conduit connecting with one of said apertures to divert the discharge therethrough, a movable member subjected to the pressure from said diverted stream and the back pressure in the conduit behind the partition, and a valve controlled by said movable member to maintain equal pressures on opposite sides of said diaphragm and consequently equal conditions of back pressure for the discharging streams.

6. An apparatus for measuring the flow of fluids comprising a conduit through which the fluid flows, a diaphragm extending across said conduit having a plurality of like apertures therethrough, a conduit connected to receive the fluid discharged through one of said apertures and to divert the same, a valve for variably restricting the discharge of said diverted fluid, a movable member exposed on one side to the pressure of the diverted fluid in advance of said valve, means for exposing the opposite side of said movable member to a pressure equal to the pressure in the conduit behind said apertured partition, and a connection between the movable member and said valve, whereby the latter is operated by the differential pressure on said movable member to establish equal pressures on opposite sides thereof.

7. An apparatus for measuring the flow of fluids, comprising a conduit through which the fluid flows, a partition extending across said conduit and provided with a plurality of like apertures therethrough, a conduit for diverting fluid discharged through one of said apertures, means for condensing the diverted fluid to collect and measure the same, means for variably restricting the flow of said diverted fluid to said condenser to regulate the back pressure thereon, and controlling means for the variably restricting means operable by differential pressure between the head pressure of the diverted stream and the back pressure in the conduit behind the partition to maintain equal back pressure upon said diverted stream and against the flow of fluid through the other apertures.

8. An apparatus for measuring the flow of fluids comprising a conduit through which the fluid flows, a partition across said conduit having a determined number of like apertures therethrough, a second conduit connected to one of said apertures to divert the fluid passing therethrough from the main stream, a casing having a flexible diaphragm therein, means for connecting said second conduit to said casing upon one side of said diaphragm, a pipe connected to said casing upon the other side of said diaphragm and communicating with said first mentioned conduit on the down stream side of said partition, an outlet for said casing, and a valve for said outlet controlled by said diaphragm to maintain equal back pressures upon the main stream and the diverted stream.

9. An apparatus for measuring the flow of fluids comprising a fluid conduit having an enlarged central portion, a partition extending across the enlarged portion of said conduit and provided with a plurality of apertures, a second conduit connected to one of said apertures to divert the fluid passing therethrough from the main stream, said conduit having the inlet portion thereof extending in substantially the same direction as the direction of flow through said first conduit, means for maintaining the same condition of back pressure against the diverted stream as against the main stream, and means for measuring the fluid passing through said second conduit.

10. An apparatus for measuring the flow of fluids comprising a fluid conduit having a central portion of greater cross sectional area than the end portions, a partition extending across said conduit in said central portion and having a plurality of apertures permitting the fluid to pass therethrough, a second conduit connected to one of said apertures to divert the fluid passing therethrough from the main stream, said conduit having the inlet portion thereof extending in substantially the same direction as the direction of flow through said first conduit, means for maintaining the same condition of back pressure against the diverted stream as against the main stream, and means for measuring the fluid passing through said second conduit.

In testimony whereof I affix my signature.

CHARLES L. WEIL.